Oct. 11, 1966   J. D. HARPER ETAL   3,277,657
METHOD AND APPARATUS FOR FLASH FREEZING VARIOUS PRODUCTS
Filed Sept. 15, 1965   6 Sheets-Sheet 6
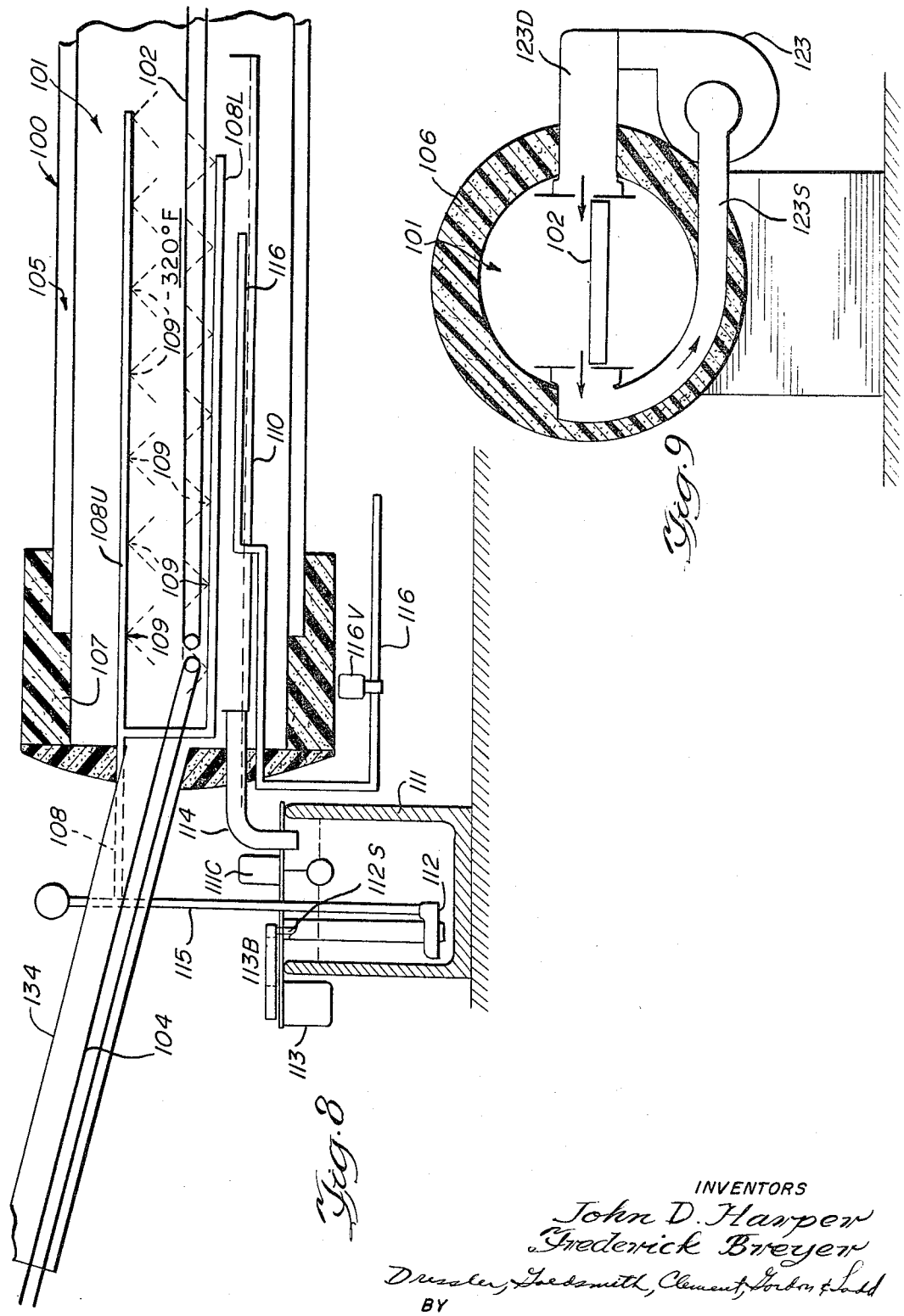
INVENTORS
John D. Harper
Frederick Breyer
BY Dressler, Goldsmith, Clement, Gordon & Ladd
ATTORNEYS

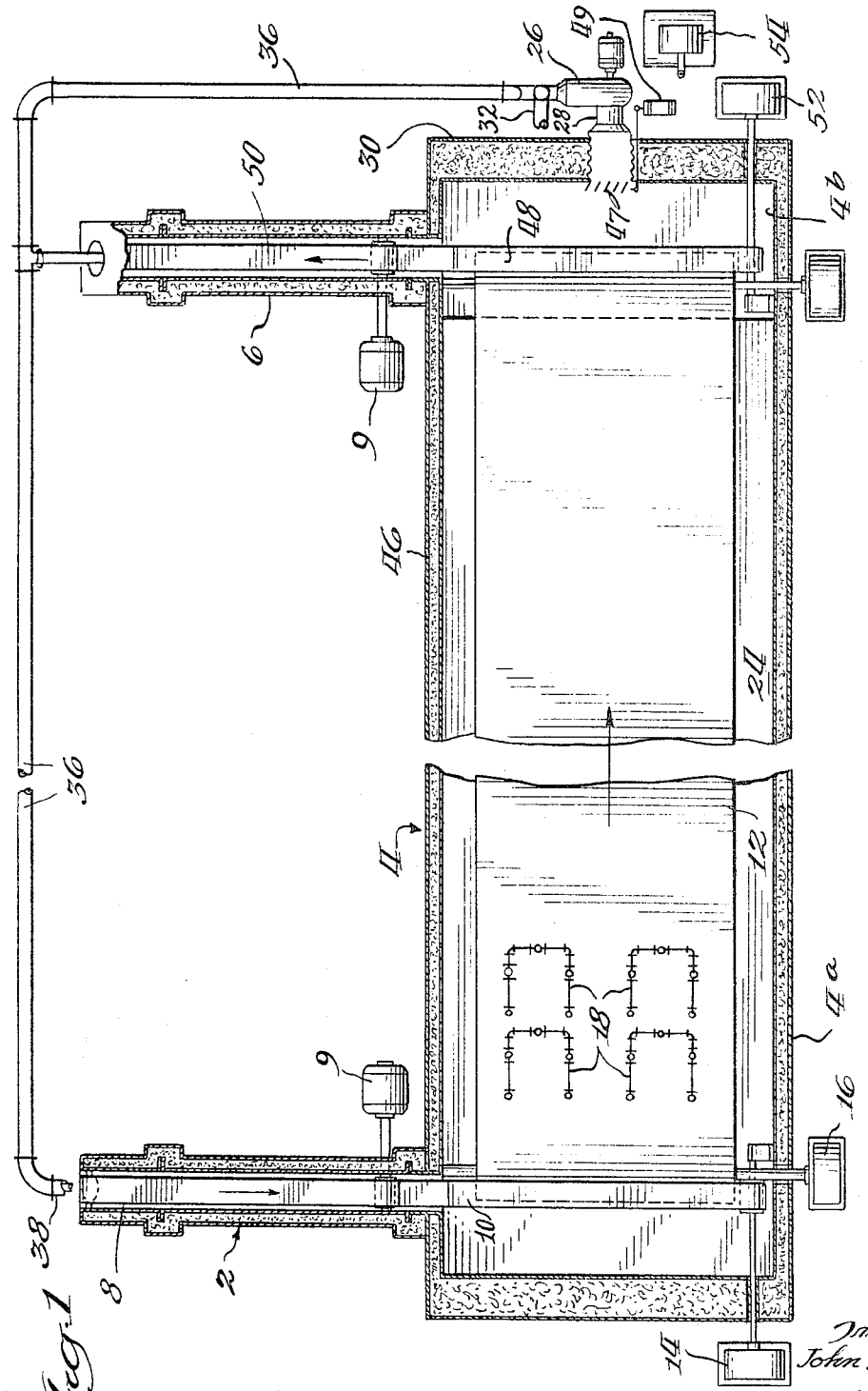

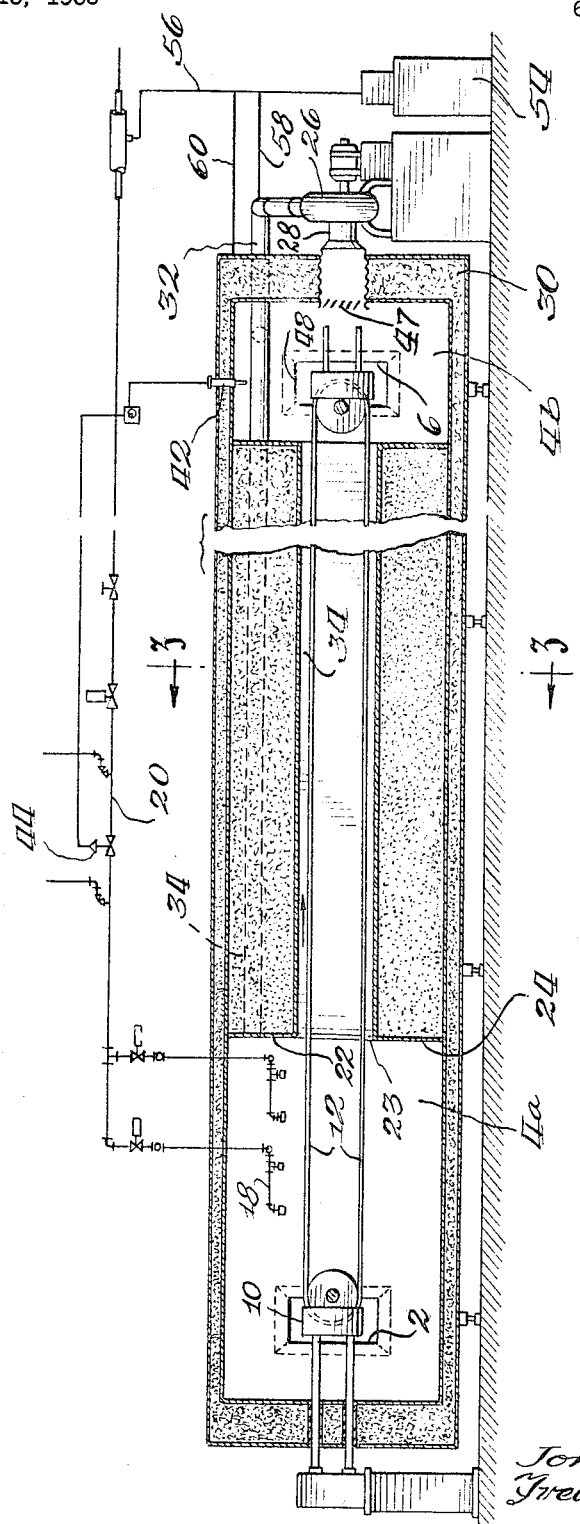

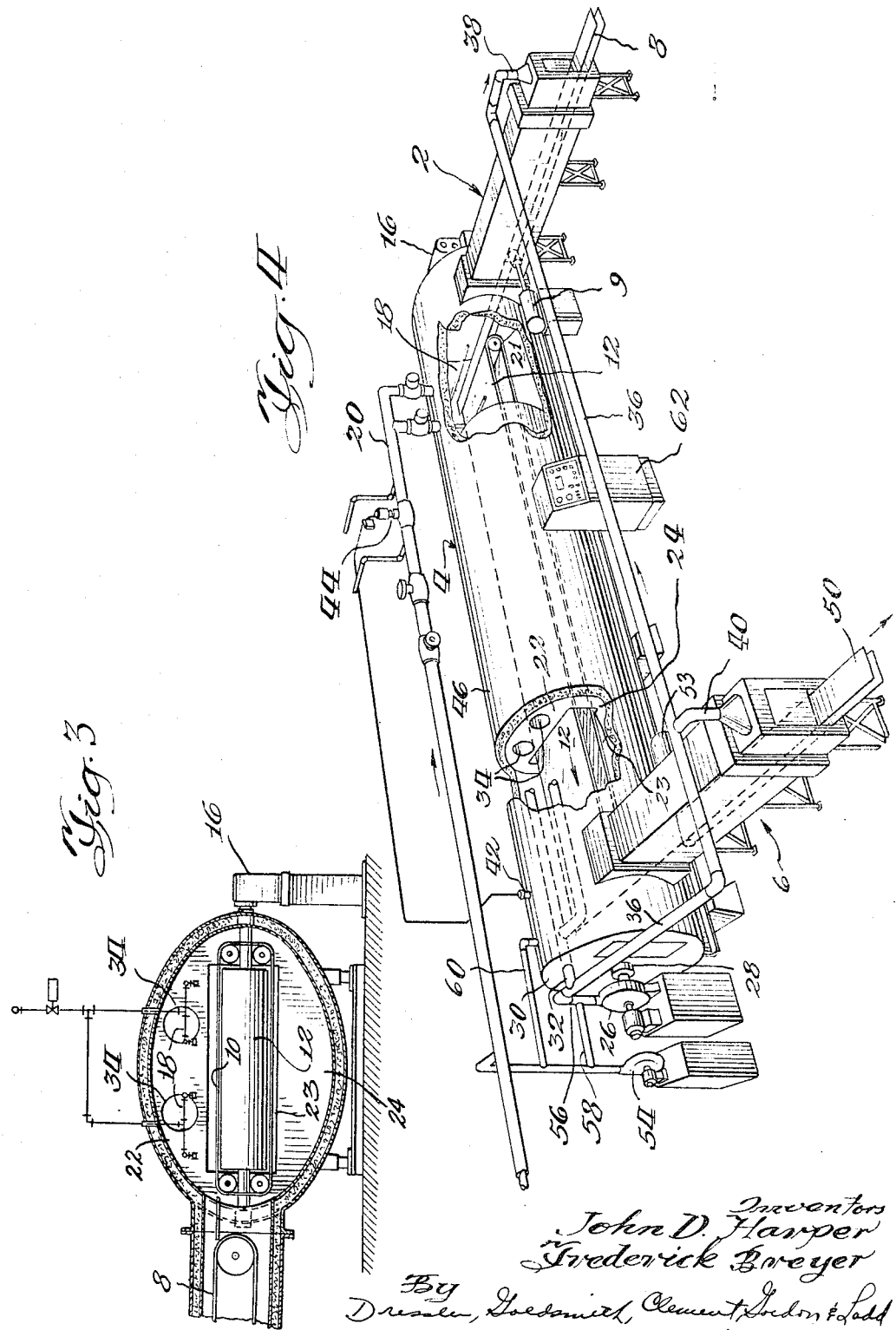

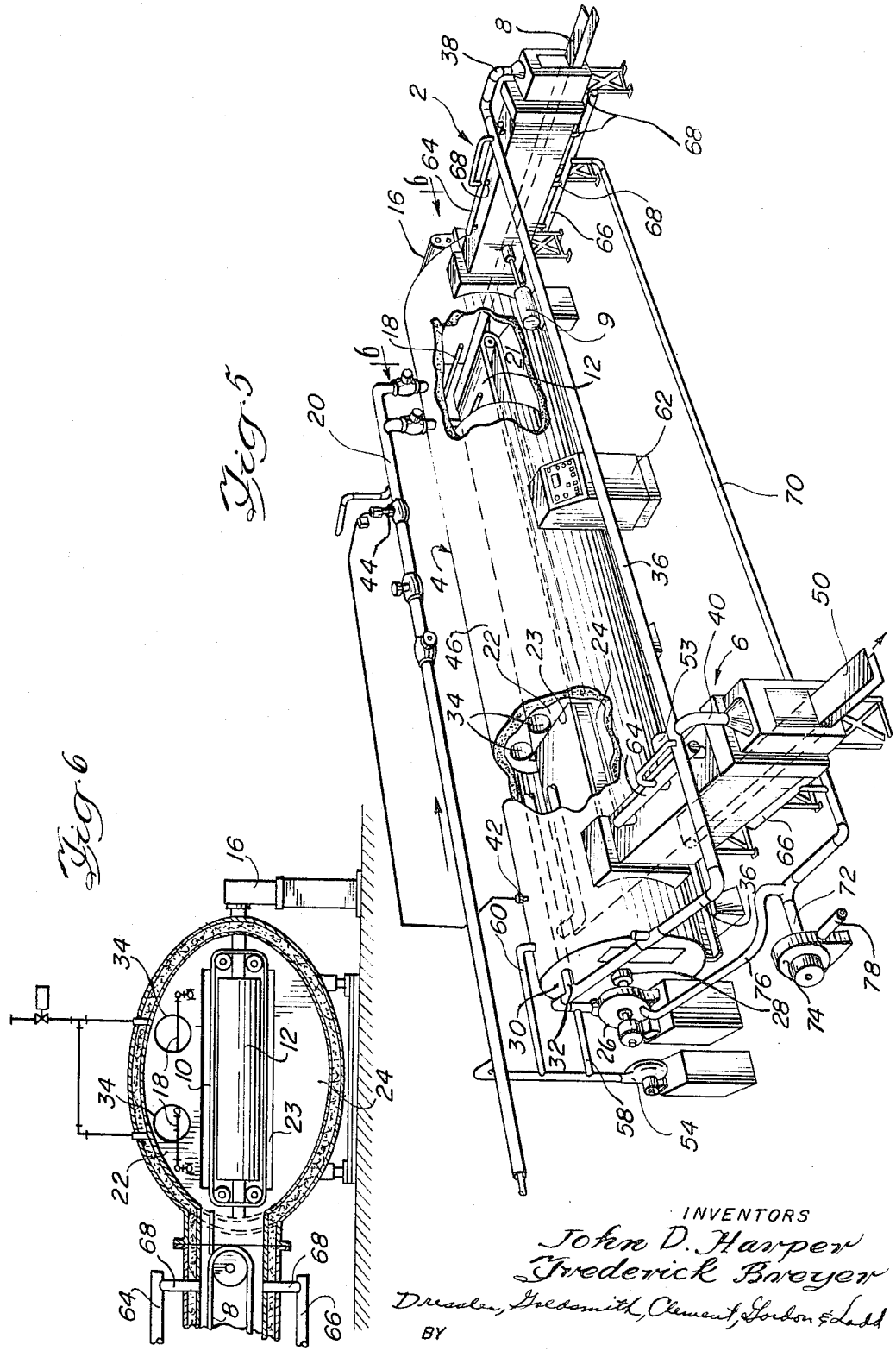

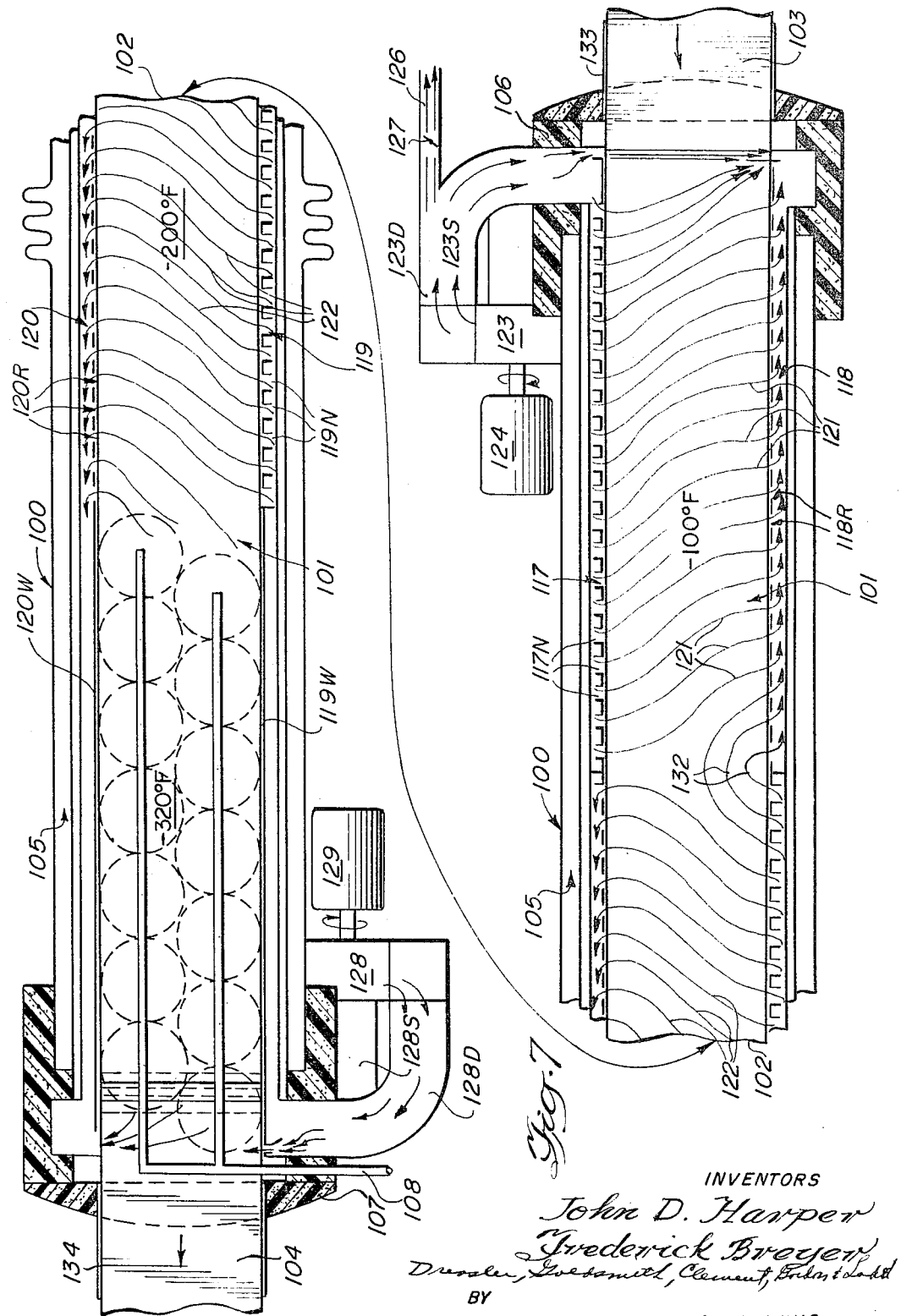

3,277,657
**METHOD AND APPARATUS FOR FLASH FREEZ-
ING VARIOUS PRODUCTS**
John D. Harper, Elgin, and Frederick Breyer, Highland
Park, Ill., assignors to Integral Process Systems, Inc.,
a corporation of Illinois
Filed Sept. 15, 1965, Ser. No. 487,446
16 Claims. (Cl. 62—63)

This application is a continuation-in-part of copending application S.N. 343,087, filed February 6, 1964.

This invention relates to a method and apparatus for freezing both food and non-food products by the use of the latent heat of vaporization of liquid nitrogen and the specific heat of ultra-cold nitrogen gas. The application of the instant invention is particularly directed to the flash freezing of foods, which is by way of example only.

The present freezing methods, including blast freezing and immersion freezing techniques, are subject to many disadvantages including inefficiency of operation, length of time required to satisfactorily freeze the products, and the cost factor. In addition, the present methods are limited as to the amount of product that can be frozen in any given time period. A contributing factor to the reduction in efficiency is the lack of adequate insulation to permit maximum utilization of the fluid being used as the cooling medium. Heretofore, conventional insulating techniques have not been completely satisfactory and have substantially added to the cost of the coolant used.

Other problems encountered when employing the "blast freezing" method include the change in crystalline structure and the disturbance of the quality of the food product.

It can be appreciated that a system whereby food products can be instantaneously frozen in a continuous process at a price that would be economically feasible would be a boon, both to the food processor and the consumer who would like to have food products always available regardless of the season of the year.

In accordance with the present invention, there is provided a method and apparatus for the efficient and economical "instant freezing" of various products including those frozen foods presently available on the market. Other products would include meat, poultry, sea food, bakery products, and prepared foods. Examples of other uses for which the process may be utilized include the shrink fitting of bearings and the stress relieving of aluminum castings.

The method of this invention, in one aspect thereof, involves flash freezing of articles in a substantially thermally isolated chamber and includes the steps of transporting the articles along a process path into, through and out of said chamber, directing a spray discharge of liquid nitrogen against each article when at a path region within the chamber to flash at least partially to gas for generating fresh gaseous nitrogen within the chamber, drawing off gaseous nitrogen from the chamber and returning some of it to the chamber to maintain a high velocity flow stream that impinges upon each article at another region along the process path, and releasing some of the gaseous nitrogen to atmosphere after article impingement travel in the stream for maintaining atmospheric pressure substantially throughout the remainder of the chamber.

The method employed utilizes the latent heat of vaporization during the "flashing" of liquid nitrogen to a gas in the immediate vicinity of the product to be frozen. In accordance with one of the important aspects of this invention, the ultra-cold nitrogen gas is effectively utilized to aid in the freezing process by recirculating the gas over the product at high velocities to bombard and completely encompass the product to take advantage of the chilling effect of the fast moving gas.

In order to effectively utilize the latent and specific heat of the liquid and gaseous nitrogen, the freezing process takes place in a chamber that is fully insulated by highly efficient insulation techniques involving drawing and maintaining a vacuum between spaced walls that surround the process chamber.

An example of the type of apparatus that can be used for practicing the method discussed above includes an insulated process chamber maintained at substantially atmospheric pressure at the regions through which the product to be frozen is moved on a continuously moving steel mesh or parallel wire conveyor. Liquid nitrogen entering the chamber is first discharged as a spray directly against the product and upon flashing to gas is drawn into a high velocity gaseous nitrogen stream that continuously recirculates along a path that impinges against the articles.

Several embodiments of flash freezer equipment are disclosed herein for performing the freezing method of this invention.

In one embodiment, the process chamber has inlet and outlet tunnels each equipped with delivery conveyors and subjected to gaseous nitrogen streams for effecting pre-cooling and post-cooling of the product, the actual flash freezing being carried out in the vacuum insulated process chamber. Flash freezing is accomplished by the combination of a direct spray discharge of liquid nitrogen against the product and a high speed recirculation stream of cold gaseous nitrogen also directed against the product. This stream travels in the lengthwise direction along the process path in this form.

A modification provides for the gaseous nitrogen streams to travel transversely of the article travel substantially throughout the infeed and outfeed tunnels. In these arrangements, fast moving cold nitrogen gas is also used to form a curtain to prevent the admission of warm and humid ambient air with the product during its entry into the chamber. Suitable conveyors and drive means therefore are provided to direct the product through the entrance tunnel to the main conveyor moving longitudinally through the process chamber.

When the frozen product reaches the end of the process chamber, it is removed therefrom by the use of suitable transfer and exit conveyor systems. The exit conveyor is directed through an exit passageway or tunnel which leads to a refrigerated storage area. The exit tunnel is also cooled by cold nitrogen gas and the ambient air is prevented from entering the process chamber through the exit tunnel by the provision of a curtain of cold nitrogen adjacent the exit end of the tunnel.

The product moving through the process chamber on the longitudinally moving conveyor is continuously subjected to cold gaseous nitrogen being circulated at a high speed by a fan located at the exit end of the process chamber. The fan pulls the cold gaseous nitrogen through the process chamber and recirculates it within the chamber to make the maximum use of the cold gas.

In another embodiment, cold gaseous nitrogen is passed transversely across the path of the moving food product in the main process chamber. This is a fast moving stream which is made up in part of freshly generated nitrogen gas vaporized from the liquid nitrogen spray that is discharged directly against the product. This combined gas stream is recirculated for repeated passage across the path of the moving food product or other article. A portion of the recirculated gas stream is bled off to regulate the pressure within the process chamber.

In this form, the inlet and outlet tunnels are arranged to provide a gradual outward flow of gaseous nitrogen.

This exfiltration provides a certain pre-cooling and post-cooling effect and precludes entry of ambient air.

A particularly effective arrangement for insulating the main process chamber is disclosed. Concentric shells or sleeves having suitably spaced walls encircle and define the process. Vacuum is maintained in the annular region between these walls and all connections of the external components required for the liquid nitrogen system and the gaseous nitrogen recirculation system are made through insulated end spools so that the vacuum section is not broken or otherwise interrupted by external connections.

To accommodate thermal expansion and contraction, the outer shell is provided with a flexible joint at an intermediate region while the inner shell is unitary and connected to the outer shell only at its opposite ends. The flexible joint allows the outer shell to follow the expansion and contraction movements of the inner shell, with external supports for the outer shell facilitating its lengthwise sliding follower movement.

The temperature within the process chamber is sensed by a temperature transmitting means that serves to control the temperature within the chamber by regulating the flow of liquid nitrogen into the chamber.

It has been found that for certain applications, exposure of the food product for two to six minutes within the chamber is sufficient to lower the temperature of the product the desired amount. This range is merely exemplary since, depending on the speed of the conveyors and the length of the chamber, doughnuts can be exposed for a period of fifteen seconds and hams for ten minutes, which are the requisite times necessary to freeze them.

Other features and advantages of the present invention will be apparent from the following description and the attached drawings, in which:

FIG. 1 is a cross-sectional plan view of one embodiment of an apparatus for flash freezing various products;

FIG. 2 is a side elevation cross-section of the process chamber shown in FIG. 1;

FIG. 3 is a view taken along lines 3—3 of FIG. 2;

FIG. 4 is a view in perspective, partially broken away, of the process chamber of the embodiment of FIGS. 1, 2 and 3 and the exit and entrance transitional tunnels;

FIG. 5 is a perspective view corresponding generally to that of FIG. 4, and showing a modification of the arrangement to provide transverse flow of gaseous nitrogen across each of the tunnels;

FIG. 6 is a view taken along lines 6—6 of FIG. 5;

FIG. 7 is a diagrammatic plan sectional view through the complete apparatus;

FIG. 8 is a fragmentary lengthwise section through the downstream end of the apparatus; and FIG. 9 is a transverse section through the inlet end spool of the process chamber structure.

Referring first to FIG. 1, there are illustrated the entrance tunnel 2, a hollow housing defining a process chamber 4 and exit tunnel 6, which make up the main structural components of the apparatus through which the product moves during the freezing process.

The entrance or transitional tunnel 2 leading from the ambient atmosphere to the interior of the process chamber 4 is generally rectangular in cross section and is insulated as, for example, by the use of a multilayer polyurethane and aluminum foil insulation. The size of the tunnel is made as small as possible, commensurate with the size of the article to be frozen, to minimize the amount of ambient air that can flow therethrough. The entrance tunnel is cooled to approximately −20° F. by the introduction of gaseous nitrogen through a suitably placed conduit which will be described in detail hereinafter. The gas conduit is also positioned to provide a high velocity curtain of cold nitrogen gas to prevent the introduction of ambient air into the tunnel.

Located within the entrance tunnel is an entrance conveyor 8 driven by suitable drive means 9 on which the product to be frozen is transported into the process chamber 4. The cold nitrogen introduced into the tunnel 2 precools the product disposed on the entrance conveyor.

The inner and of the tunnel 2 is suitably connected to the entrance end 4a of the process chamber. The entrance conveyor 8 directs the product into the process chamber onto a transfer conveyor 10 located wholly within the process chamber. The transfer conveyor 10 functions to move the product onto a process conveyor 12, which carries the product longitudinally through the process chamber. The process conveyor is made of stainless steel wire mesh, which permits the circulation of gas therethrough. The transfer conveyor and process conveyor are driven by suitable drive means 14, 16.

Immediately adjacent the entrance of loading end 4a of the process conveyor are located a plurality of spray nozzles 18 to which liquid nitrogen is directed through conduit 20 (FIG. 2). The liquid nitrogen is at −320° F. and under 15-pound pressure in the conduit 20. Upon the exiting of the liquid nitrogen into the process chamber, which is under substantially atmospheric pressure, the liquid nitrogen flashes to a gas and the latent heat of vaporization of the nitrogen initiates the freezing process of the product disposed on the portion of the conveyor located immediately below the spray nozzles 18. When the process is started, the temperature surrounding the loading end of the conveyor is kept at approximately −320° F.

After the product on the conveyor leaves the entrance section or zone 4a of the process chamber, it is moved by the conveyor through a passageway or tunnel 23 formed between upper and lower internal bulk head sections 22 and 24, respectively. During the movement of the product through the passageway 23, it is subjected to the cold gaseous nitrogen being moved at a high velocity by a fan 26 having an inlet duct 28 disposed in the end wall 30 of the exit section 4b of the process chamber. The action of the fan draws the gaseous nitrogen at a high velocity through the tunnel 23 and then blows it out through a plurality of conduits that serve to recirculate the cold gaseous nitrogen through the process chamber and tunnel 23, provide gaseous nitrogen for cooling the tunnels, and a high velocity curtain of cold gas over the tunnel openings to prevent the admission of ambient air into the process chamber. The pressure within chamber 4 is regulated by a damper 47 that controls the flow of gaseous nitrogen into the fan inlet. The position of the damper is controlled by damper motor 49.

More specifically, the fan 26 directs cooling gas through conduit 32 into recirculating gas ducts 34 located in upper bulk head section 22, which leads the cold gas from chamber exit section 4b back to the entrance section 4a of the process chamber, from where the gas is again drawn back by the fan to recirculate same. A second conduit 36 communicates with the fan and directs the cold gaseous nitrogen to branch conduits 38, 40 which lead to the entrance and exit tunnels 2, 6, respectively. The spent cold nitrogen gas exits through the transitional tunnels into the surrounding atmosphere. It may, of course, be drawn off by auxiliary exhaust means, if desired.

The temperature within the process chamber is sensed by a temperature transmitter 42 extending within the process chamber adjacent the exit tunnel. The temperature transmitter controls the operation of a main valve 44 which regulates the flow of liquid nitrogen in the conduit 20 to the spray nozzles 18. It should be noted that the temperature transmitter can be set to whatever temperature desired, and if the product to be frozen can be done in an environment of less than −300° F., then the transmitter would be set for the requisite temperature and thus limit the amount of liquid nitrogen introduced through the spray nozzles.

Located at the end of the process chamber is a second transfer conveyor 48 which takes the product off of the process conveyor 12 and leads it onto an exit conveyor 50. The exit transfer conveyor 48 is operated by drive means 52 and the exit conveyor by suitable drive means 53. The exit tunnel 6 is secured to the side wall 46 of the process chamber and is insulated by a multilayer polyurethane and aluminum foil insulation similar to that used in the entrance tunnel. The exit portion of the exit tunnel is provided with a high velocity gas curtain by the gaseous nitrogen directed thereto through conduit 40.

As previously stated, it is important that the chamber and various conduits be very well insulated to minimize the heat transfer through the walls thereof. To this end, the process chamber as well as the conduits carrying the liquid and gaseous nitrogen are insulated by a material commonly known as Perlite, or a multilayer polyurethane and aluminum or Mylar film. The insulating material selected is located between the walls of the pertinent conduits and the process chamber. To further enhance the effectiveness of this insulation, it is subjected to a vacuum by a vacuum pump 54 that is connected to the various insulated wall portions of the conduit 20 carrying the liquid nitrogen, conduit 36 carrying the gaseous nitrogen and the walls of the process chamber 4 through conduits 56, 58, 60. The inner wall of the chamber 4 and all other areas in proximity to the food product are constructed of stainless steel, and the outer shell is of a mild steel. The differential expansion between the inner and outer walls of the chamber is compensated for by a bellows, or other suitable means.

The controls for the system may be centrally located in a control panel 62, as shown in FIG. 5, to govern the introduction of the liquid nitrogen, fan velocity, and rate of travel of the conveyors. The conditions under which these various components operate can be varied to permit different techniques of freezing food or other products.

The aforementioned apparatus can be used for both freezing of food products and other articles. The utilization of the apparatus is in no way limited to a particular item to be frozen and could include individual items such as peas, tomatoes, potatoes, or any number of packaged items. The apparatus is capable of handling pre-packaged goods as well as loose items. With respect to packaged goods, the vacuum insulated chamber can be made of any length desired to subject the product to as long a cooling cycle as desired. In the case of a number of food products, it is believed that a period of two to six minutes is sufficient to cool it to the desired temperature. A system of the type illustrated is capable of delivering sixty or more units of frozen food products per minute, or approximately one ton of frozen food products per hour. This is by way of example only and is not intended to be limiting, since it is obvious that the size can be varied to fit the desired conditions and mode of operation. Another use for the method and apparatus would be to put a crust on the product instead of freezing it clear through. An example would be to flash freeze the outer layer of chicken legs, which could then be breaded and packaged. In this case, the conveyor would be speeded up, or the process chamber would be made very short to reduce the exposure time of the product to the cold nitrogen.

The method can obviously be produced on both portable and stationary equipment, and the particular apparatus disclosed is readily adaptable to either interplant location, or due to its compactness, can be easily trucked to the producing field to flash freeze the product as it is being picked. All that would be necessary in addition to the picking and packaging apparatus would be a source of liquid nitrogen, a source of electrical power and a storage container for the freezing product.

While a particular embodiment has been disclosed, it is understood that the apparatus could take various forms. This could include providing the entrance and exit transitional tunnels with closures, such as gates made of Teflon, or other suitable materials. The gates would be used to shut off the flow of ambient air into the process chamber during a shut-down period, or when the entrance conveyor is not filled with product. If desired, two Teflon gates located at opposite ends of the entrance and exit tunnels could be used, and in the case of the entrance tunnel, the portion of the conveyor therebetween could be used to store product when nitrogen is first introduced into the process chamber. In such a situation, the inner gate would be closed when the entrance conveyor is being loaded, and then the outer gate would be closed and the inner gate opened to precool the product on the conveyor. It is to be noted that during start-up of the chamber, i.e., when liquid nitrogen is first introduced, one or both gates in each of the tunnels would be closed to prevent the induced draft fan from drawing ambient air into the process chamber and thus resulting in a substantial loss in efficiency.

In addition, it is not essential that entrance and exit transitional tunnels be provided, since the product to be frozen could be introduced directly into the process chamber. Also, the path of the recirculated gas could be varied by the introduction of baffles in the upper internal bulk head to direct the gas down into the tunnel 23 throughout the length thereof.

Another embodiment closely related to that of FIGS. 1 to 4 is illustrated in FIGS. 5 and 6. Corresponding reference characters are employed to identify the similar parts. A particular feature in the embodiment of FIGS. 5 and 6 resides in the provision of a recirculated gas stream flowing transversely of the movement path of the articles through the entrance and exit tunnels 2 and 6, respectively. For this purpose, each of the entrance and exit tunnels has an upper high pressure manifold 64 and a lower low pressure manifold 66 connected by spaced pipe stubs 68 shown entering through the top and bottom walls, respectively, of each tunnel. The branch conduit 36 feeds the high pressure manifolds 64 and again feeds the conduits 38 and 40 which are directed downwardly to create a gas curtain across the mouth of each tunnel. The lower manifold 66 underlying each tunnel is extended and connected adjacent this mouth region to provide a convenient exhaust path for the gas curtain.

A return conduit 70 is shown connected to each of the lower manifolds 66 and leads to the suction line 72 of a gas exhaust pump 74. The suction line 72 is also fed by a drawoff conduit 76 connected to the fan 26. The gas exhaust fan 74 has a discharge line 78 open to atmosphere and discharge flow from the system may be regulated at this point to attain prescribed temperature and pressure balances. To facilitate the development of effective transverse flow streams directed vertically downwardly in each of the entrance and exit tunnels, the entrance conveyor 8 and the exhaust conveyor 50 are of open mesh construction and enable unimpeded gas flow therethrough. This conveyor construction also facilitates maintaining an effective gas curtain at each of the tunnel mouths.

A flash freezing liquid nitrogen system together with typical flow rates and temperatures is provided in diagrammatic FIGS. 7 to 9 for purposes of illustrative disclosure. Many structural features of the system are also incorporated in these diagrammatic figures.

Referring now particularly to the diagrammatic views of FIGS. 7 to 9, the system includes hollow housing structure 100 defining a substantially thermally isolated process chamber 101 having a conveyor 102 extending substantially full length therein and operating at a predetermined speed to advance products along a process path that leads through the process chamber in a direction from right to left as viewed in FIG. 7. An in line entrance conveyor 103 is shown leading into the process chamber at the right in FIG. 7 and an in line exit conveyor 104 is shown leading from the process chamber at the left in FIGS. 7 and 8. The housing structure 100 is configured to present an annular insulation space 105 completely encircling the process chamber and normally maintained at a vacuum level of less than 10 microns of mercury.

At the product infeed end, the housing structure is terminated in an insulated entrance spool 106 having a restricted mouth through which the entrance conveyor 103 extends and at the product delivery end, the housing structure is terminated in an insulated exit spool 107 having a restricted mouth through which the exit conveyor 104 extends. Spray discharge mechanism, as provided in this form, includes a cryogenic liquid supply line 108 feeding an upper pair of headers 108U and a lower pair of headers 108L arranged adjacent the downstream end of the process chamber and occupying about ⅓ of the length of the process chamber. A set of seven spray nozzles 109 are shown on each header, each issuing a wide angle hollow cone, solid or fan spray discharge. The precise number of nozzles per header can be varied depending upon the product to be frozen. The nozzles associated with the upper headers 108U are directed vertically downwardly and the nozzles associated with the lower header 108L are directed vertically upwardly. The spray patterns as shown in FIGS. 7 and 8 are in a staggered alternating close fit relationship to span the entire width of the conveyor and progressively deposit atomized liquid droplets substantially uniformly against both the top and bottom faces of the articles. The conveyor 102 is of open mesh construction enabling necessary flowthrough for the upwardly directed nozzles associated with the bottom header. One of the features of the arrangement is the use of mass flow rates of cryogenic liquid substantially in excess of the mass rate at which liquid flashes to nitrogen within the chamber. The excess liquid emitted by the spray discharge is collected in a pan-shaped reservoir or tray 110 which underlies the conveyor 102 and the headers 108U and 108L adjacent the downstream end of the process chamber.

An arrangement for recirculating excess liquid to sustain the prescribed higher spray discharge rate is provided externally and includes a dewar 111 or other vacuum insulated vessel providing a sump for cryogenic liquid, a cryogenic pump 112 suspended in submerged relation in the cryogenic liquid in the dewar, a drive motor 113 mounted externally of the dewar and having a drive belt 113B connected to the exposed upper end of the pump drive shaft 112S. The pump 112 is illustrated as being of a centrifugal type and further particulars of its arrangement and construction are provided in a copending application entitled, "Cyrogenic Pump," Serial No. 479,825, filed August 16, 1965, in the name of Richard C. Wagner. The disclosure of said application is specifically incorporated herein by this reference.

To complete the liquid recirculation system a drain line 114 leads from the collector pan 110 to the sump to return unused cryogenic liquid and a delivery line 115 leads from the discharge side of the pump and connects to the supply line 108 to the headers. The amount of liquid flashing to gas is related to the product flow rate through the process chamber and this amount must be constantly made up in order to sustain the spray discharge flow rate. A line 116 is shown which leads from a cryogenic liquid supply tank (not shown) exterior to the system, the line 116 having a solenoid control valve 116V and extending through the exit spool 107 to open directly into the collector pan 110 for supplying the make up liquid. Since the pressure at this external source and acting in the line 116 normally is greater than the pressure acting on the headers, the release of the make up liquid is accompanied by more pronounced flashing to vapor. The latent energy release associated with the pressure transition at the point of liquid release and evidenced by direct flashing to vapor is utilized in the present arrangement by connecting the make up line to empty at a point directly within the process chamber.

The process chamber 101 is shown provided with internal housing structure to define a first set of opposed transversely spaced high pressure and low pressure plenum chambers 117 and 118, respectively, adjacent and flanking the process path along the upstream end of the process chamber and a second set of opposed transversely spaced high pressure and low pressure plenum chambers 119 and 120, respectively, adjacent and flanking the process path along an intermediate region of the process chamber. In the case of the upstream set, the high pressure chamber 117 is provided with an array of control nozzles, as represented at 117N, and the low pressure chamber 118 is provided with a corresponding array of receiver openings 118R collectively to define a gas recirculation flow path that is oriented substantially transversely of the upstream end of the process path as represented by the flow arrows 121. Correspondingly, the high pressure chamber 119 of the intermediate set is provided with an array of control nozzles, as represented at 119N, and the low pressure chamber 120 is provided with a corresponding array of receiver openings 120R which define a gas recirculation flow path also oriented approximately transversely of the process path but moving in an opposite side to side direction, as represented by the flow arrows 122, to provide impingement against an opposite region of the articles as they progress along the process path.

A gas recirculation system is asociated with the entrance spool 106 and includes an externally mounted fan 123 powered by a drive motor 124 and having a discharge conduit 123D extending laterally through the wall of the spool immediately adjacent the end of the hollow housing structure 100 and a suction conduit 123S which, as best shown in FIG. 9, extends partway internally of the spool 106 and emerges laterally at a lower elevation. It will be noted that the discharge conduit 123D from this gaseous recirculation system branches to feed an exhaust conduit 126 that is equipped with a damper type control valve 127 to relate the rate of release of exhaust gas to the rate at which liquid flashes to gas within the process chamber for maintaining desired temperature and pressure balance within the system. In the disclosed arrangement, the process chamber is maintained substantially at atmospheric pressure and the control of the exhaust rate may be accomplished either by regulating with pressure as a reference, though this requires unduly sensitive equipment, or by regulating with temperature as a reference.

A corresponding gas recirculation system is provided at the discharge end of the process chamber and includes an externally mounted recirculation fan 128 powered by a drive motor 129 with the fan having its discharge conduit 128D entering laterally through the exit spool 107 and having its suction conduit 128S arranged partly in the spool and exiting at a lower elevation.

The plenum chambers 119 and 120 which constitute the intermediate set have masked wall regions 119W and 120W flanking the liquid spray discharge area and opening into the exit spool 107 to communicate with the discharge and suction conduits from the fan 128. Similarly, the plenum chambers 117 and 118 of the upstream set open into the entrance spool 106 and communicate with the discharge and suction conduits of its recirculation fan 123.

A high velocity gaseous curtain is provided across the mouth of each spool 106 and 107 by arranging the opposite internal face portions of each spool with suitable opposed openings to effect a continuous gas flow pattern directed laterally adjacent to the mouth region. These curtains serve to exclude ambient atmosphere from the process chamber and they are particularly effective where the process chamber is operating at or near atmospheric pressure.

In the arrangement shown in FIGS. 7 to 9, the fact that gaseous nitrogen is withdrawn upstream, through the exhaust conduit 126 at the inlet end, and the fact that fresh gaseous nitrogen is introduced downstream, by virtue of the liquid flashing to gas at this region, results in a temperature profile wherein heat exchange between the cryogenic fluid and the product is optimized. In general, arrows 131 adjacent the upstream end of the spray discharge pattern indicate the manner in which the freshly released gas joins in the transverse flow pattern developed by the intermediate set of plenum chambers 119 and 120. Arrows 132 bridge the high pressure chamber 119 of the intermediate set with the low pressure chamber 118 of the upstream set so that there is a gradual transfer of gaseous nitrogen towards the upstream end of the process chamber.

Optimum heat transfer is effected because the product, when at its warmest state, is exposed to gas at its warmest state within the system; the product when partially cooled is exposed to colder gas; and the product when further cooled is exposed to cryogenic liquid to complete the process.

For purposes of illustrative disclosure, typical values are given for operating the flash freezer apparatus in a practical application involving flash freezing of bakery goods at a rate of 2500 lbs. per hour. The delivery line 115 from the cryogenic pump 112 handles a rated flow of 5100 lbs. per hour of cryogenic liquid supplied at a pressure of 6 p.s.i. to be spray discharged in distinct wide angle spray patterns by the precision nozzles 109 which, by way of example, may have a ⅛" diameter orifice and be of the type identified as No. 18B5–5W of Spraying Systems Co.

For bakery goods, the system utilizes about one pound of liquid nitrogen for each pound of product. In the example, 2500 pounds of product are processed per hour so liquid flashes to gas at the spray discharge region at a rate of about 2500 pounds per hour. The excess is collected in the tray 110 and is drained back to the sump provided by the external dewar 111. Fresh liquid nitrogen is supplied through the make up line 116 which enters through the exit spool 107 and opens directly into the tray 110. The average rate of make up liquid entry is therefore 2500 pounds per hour, and this liquid also drains into the sump after its release at a point within the chamber.

The temperature of the entering cryogenic liquid is about −320° F. The flow volume of the gas recirculation stream between the intermediate set of plenum chambers 119 and 120 is about 1000 cubic feet per minute and the gas temperature is about −200° F. The gas recirculation fan 123 for the upstream set of plenum chambers 117 and 118 also has a flow volume of 1000 cubic feet per minute and at this region the gas is at a temperature of −100° F. A typical value for the drawoff through the exhaust conduit 126 is about 390 cubic feet per minute at a temperature of −100° F. The stream velocity across the intermediate set of plenum chambers is 3000 feet per minute and the stream velocity across the upstream set of plenum chambers is somewhat less. The total mass flow rate of the gas in these transverse flow streams is substantially greater than the mass rate of liquid flashing to gas in the chamber.

The high volume, high velocity per recirculation creates turbulence at the surface of the product or article and effects better heat transfer. Transverse flow is more efficient as it is easier to achieve high volume and high velocity and it affords a better angle of impingement upon the product.

In the disclosed embodiment, liquid nitrogen is pumped to the spray headers 108U and 108L in a saturated liquid state (all liquid and no gas); the amount of liquid nitrogen sprayed on the product is in excess (two to three times as much) of what is actually required to freeze the product; and the excess amount is collected and recirculated back to the spray headers. The spray technique used progressively and repeatedly wipes the surface of the product wtih liquid nitrogen droplets to promote rapid heat transfer. The gas generated on the surface of the product in the freezing process is penetrated by the liquid nitrogen droplets which leave the spray nozzles with adequate velocity for this purpose.

An accurate metering of liquid nitrogen to the system is not required. The liquid nitrogen level in the exterior sump provided by the dewar 111 is controlled by a simple on-off liquid level controller 111C. As liquid nitrogen is consumed in the freezing process, the level of liquid in the sump will drop and additional liquid is added to the system. Without a liquid recirculating system such as disclosed herein, the precise amount of liquid nitrogen must be added to perform the freezing operation. If an excess is added, inefficient operation will result. If too little is added, the product will not be properly frozen. The progressively deposited, full coverage high velocity spray technique results in very rapid heat transfer between the product and the liquid nitrogen. This results in high production for a relatively small unit. Since the heat transfer loss from a freezer unit to the surrounding atmosphere is a relatively fixed amount for a given size unit, the unit with the higher production rate can pro-rate this loss over a larger amount of product processed.

The entrance and exit conveyors 103 and 104 are housed in insulated ducting providing an entrance tunnel 133 and an exit tunnel 134. Each of these tunnels angles upwardly in a direction away from the process chamber and is maintained filled with cold gaseous nitrogen (which is much denser than ambient air). The process chamber is operated at slightly greater than atmospheric pressure to promote flow or exfiltration of gaseous nitrogen outwardly through each tunnel. This exfiltration is arranged effectively to exclude entry of ambient air and also provides pre-cooling in the case of the entrance tunnel 133 and post-cooling in the case of the exit tunnel 134. The product which has just been deeply frozen by the liquid nitrogen at the downstream end of the process chamber 101 may achieve thermal equilibration during the post-cooling process in the exit tunnel.

The nozzles 117N and 119N are individually rotatable structures to give some axial adjustment of the direction path of the recirculated gaseous stream. By proper adjustment of these nozzles, the exfiltration flows through the tunnels may be balanced or may be otherwise set up according to individual needs.

Thus, while preferred constructional features of the invention are embodied in the structure illustrated herein, it is to be understood that changes and variations may be made by those skilled in the art without departing from the spirit and scope of the appended claims.

What is claimed is:

1. Apparatus for flash freezing of articles comprising hollow housing structure defining a substantially thermally isolated process chamber, means including a conveyor operating in said chamber for transporting articles in succession along a process path leading into, through and out of said chamber, means including spray nozzle mechanism mounted within said chamber for directing a spray discharge of liquid nitrogen against each article at a certain region along said process path to flash at least partially to gas for freshly generating gaseous nitrogen within said chamber, pumping means having a suction inlet and a discharge outlet communicating with spaced locations within said chamber to develop a high velocity stream traveling along a recirculation flow path through said chamber from said discharge outlet to said suction inlet, said stream being comprised partly of recirculated gaseous nitrogen and partly of freshly generated gaseous nitrogen and said stream impinging upon each article at another region along said process path, and means for maintaining atmospheric pressure substantially throughout the remainder of said chamber by discharging from said apparatus a portion of the gaseous nitrogen after article impingement travel of said portion with said stream.

2. Apparatus for flash freezing of articles comprising means including hollow housing structure defining a substantially thermally isolated process chamber, means including a conveyor operating in said chamber for transporting articles in succession along a process path leading into, through and out of said chamber, means including spray nozzle mechanism mounted within said chamber for directing a spray discharge of liquid nitrogen against each article at a certain region along said process path to flash at least partially to gas for freshly generating gaseous nitrogen within said chamber, pumping means operable concurrently with the spray discharge means and having a suction inlet and a discharge outlet communicating with spaced locations within said chamber and adjacent the process path to develop a high velocity stream traveling along a recirculation flow path leading through another region of said chamber intersected by the process path, said stream being comprised partly of recirculated gaseous nitrogen and partly of freshly generated gaseous nitrogen and said stream impinging upon each article at the last named region along said process path, and means for maintaining atmospheric pressure substantially throughout the remainder of said chamber by discharging from said apparatus a portion of the gaseous nitrogen after article impingement travel thereof with said stream.

3. Apparatus for flash freezing of articles comprising hollow housing structure defining a substantially thermally isolated process chamber, means including a conveyor operating in said chamber for transporting articles in succession along a process path leading into, through and out of said chamber, means including spray nozzle mechanism mounted within said chamber for directing a spray discharge of liquid nitrogen against each article at an upstream region along said process path to flash at least partially to gas for freshly generating gaseous nitrogen within said chamber, pumping means operable concurrently with the spray discharge means and having a suction inlet and a discharge outlet communicating with streamwise spaced locations within said chamber to develop a high velocity stream traveling along a recirculation flow path downstream through said chamber from said discharge outlet to said suction inlet, said stream being comprised partly of recirculated gaseous nitrogen and partly of freshly generated gaseous nitrogen and said stream impinging upon each article along a downstream region of said process path, and means for maintaining atmospheric pressure substantially throughout the remainder of said chamber by discharging from said apparatus a portion of the gaseous nitrogen after article impingement travel of said portion with said stream.

4. Apparatus for flash freezing of articles comprising hollow housing structure defining a substantially thermally isolated process chamber having spaced apart upstream and downstream ends, inlet tunnel means leading to said upstream end and defining a transitional passage communicating with said chamber, exit tunnel means leading from said downstream end and defining a transitional passage communicating with said chamber, a main conveyor operating in said chamber for transporting articles in succession along a process path leading into, through and out of said chamber, means including spray nozzle mechanism mounted within said chamber for directing a spray discharge of liquid nitrogen against each article at a certain region along said process path to flash at least partially to gas for freshly generating gaseous nitrogen within said chamber, pumping means operable concurrently with the spray discharge means and having a suction inlet and a discharge outlet communicating with spaced locations within said chamber to develop a high velocity stream traveling along a recirculation flow path through said chamber from said discharge outlet to said suction inlet, said stream being comprised partly of recirculated gaseous nitrogen and partly of freshly generated gaseous nitrogen and said stream impinging upon each article along another region of said process path, means for maintaining atmospheric pressure substantially throughout the remainder of said chamber by discharging from said apparatus a portion of the gaseous nitrogen after article impingement travel of said portion with said stream, means for introducing gaseous nitrogen into each passageway after passage through the pumping means for cooling each article while located therein.

5. Apparatus for flash freezing of articles comprising hollow housing structure defining a substantially thermally isolated process chamber having space apart upstream and downstream ends, a wire mesh conveyor operating in said chamber for transporting articles in succession along a process path leading from the upstream end to the downstream end, a transfer conveyor leading to the upstream end of said wire mesh conveyor, a transfer conveyor leading from the downstream end of the wire mesh conveyor and means for preventing entrance of ambient air into said process chamber, and including a separate tunnel enveloping each transfer conveyor, means including spray nozzle mechanism mounted within said chamber for directing a spray discharge of liquid nitrogen against each article at a certain region along said process path to flash at least partially to gas for freshly generating gaseous nitrogen within said chamber, pumping means operable concurrently with the spray discharge means and having a suction inlet and a discharge outlet each communicating with spaced locations within said chamber to develop a high velocity stream traveling along a recirculation flow path through said chamber from said discharge outlet to said suction inlet, said stream being comprised partly of recirculated gaseous nitrogen and partly of freshly generated gaseous nitrogen and said stream impinging upon each article along another region of said process path, and means for maintaining atmospheric pressure substantially throughout the remainder of said chamber by discharging from said apparatus a portion of the gaseous nitrogen after article impingement travel of said portion with said stream.

6. The method of flash freezing articles in a substantially thermally isolated chamber including the steps of transporting each article along a process path leading into, through and out of the chamber, directing a spray discharge of liquid nitrogen against each article when within the chamber at a region along said path to flash at least partially to gas for generating fresh gaseous nitrogen within said chamber, drawing off gaseous nitrogen from said chamber and returning some of the drawn off gaseous nitrogen to the chamber to maintain a high velocity flow stream that impinges upon each article at another region along the process path and that is comprised partly of returned gaseous nitrogen and partly of freshly generated gaseous nitrogen, and discharging some of the gaseous nitrogen after article impingement travel in said stream for maintaining atmospheric pressure substantially throughout the remainder of said chamber.

7. The method of flash freezing articles in a substantially thermally isolated chamber including the steps of transporting each article along a process path leading into, through and out of the chamber, directing a spray discharge of liquid nitrogen against each article when within the chamber at a region along said path to flash at least partially to gas for generating fresh gaseous nitrogen within said chamber, drawing off gaseous nitrogen from said chamber and returning some of the drawn off gaseous nitrogen to the chamber at a mass flow rate greater than the mass rate of generation of fresh gaseous nitrogen to maintain a high velocity flow stream that operates concurrently with the spray discharge of liquid nitrogen and that impinges upon each article at another region along the process path and that is comprised partly of returned gaseous nitrogen and partly of freshly generated gaseous nitrogen, and discharging some of the drawn off gaseous nitrogen after article impingement travel thereof in said stream for maintaining atmospheric pressure substantially throughout the remainder of said chamber.

8. The method of flash freezing articles in a substantially thermally isolated chamber including the steps of transporting each article along a process path leading into, through and out of the chamber, directing a spray discharge of liquid nitrogen against each article when within the chamber at a region along said path to flash at least partially to gas for generating fresh gaseous nitrogen within said chamber, drawing off gaseous nitrogen from said chamber and returning some of the drawn off gaseous nitrogen to the chamber to maintain a high velocity flow stream operating concurrently with the spray discharge of liquid nitrogen impinging upon each article at a downstream region along the process path and that is comprised mainly of returned gaseous nitrogen and partly of freshly generated gaseous nitrogen, and discharging some of the drawn off gaseous nitrogen after article impingement travel thereof in said stream for maintaining atmospheric pressure substantially throughout the remainder of said chamber.

9. Apparatus for flash freezing of articles comprising hollow housing structure defining a substantially thermally isolated process chamber, means for transporting articles along a process path leading through said chamber, means for introducing liquid nitrogen into the chamber for contact with each article at a certain region along said process path to vaporize and freshly generate gaseous nitrogen within said chamber, gas pumping means having a suction inlet and a discharge outlet communicating with spaced locations in said chamber to develop a high velocity gaseous nitrogen stream that is fed by said freshly generated gaseous nitrogen and that travels a recirculation flow path through said chamber from said discharge outlet to said suction inlet, said stream being comprised partly of recirculated gaseous nitrogen and partly of freshly generated gaseous nitrogen and said stream impinging upon each article at another region along said process path, and means for diverting a portion of the gaseous nitrogen traveling through the gas pumping means to draw off gaseous nitrogen from said flow in accordance with the rate gaseous nitrogen vaporizes in said chamber.

10. Apparatus in accordance with claim 9 and including means for subjecting each article to a portion of the diverted gaseous nitrogen to precool the same in preparation for flash freezing.

11. Apparatus in accordance with claim 9 and wherein said transporting means includes a first article supporting conveyor operating along process path regions whereat said liquid nitrogen contacts each article and whereat said high velocity gaseous nitrogen stream contacts each article and wherein said transporting means includes a second article supporting conveyor for carrying articles through a precool process path region leading up to said first conveyor, said apparatus including means for subjecting each article to a portion of the diverted gaseous nitrogen while disposed on said second conveyor.

12. The method of flash freezing articles in a substantially thermally isolated chamber including the steps of introducing liquid nitrogen into the chamber, converting the liquid nitrogen into gaseous nitrogen within the chamber by contacting the liquid with the articles at a region along said path, discharging gaseous nitrogen from the chamber in a relationship to produce and maintain an environment of gaseous nitrogen throughout a process path within the chamber through which path the articles to be frozen must travel, and transporting the articles to be frozen along the process path and while such articles are along said path contacting each article with a continuously moving stream of commingled gases comprised partly of gas freshly generated within the chamber by vaporization of liquid nitrogen by article contact therein and partly of gas reclaimed after previous article contacting travel, said stream of commingled gases having a mass flow rate substantially greater than the mass rate of vaporization of liquid nitrogen in the chamber.

13. The method of flash freezing articles in a substantially thermally isolated chamber including the steps of transporting the articles to be frozen along a process path in the chamber, introducing liquid nitrogen into the chamber, converting the liquid nitrogen into gaseous nitrogen within the chamber by contacting the liquid with the articles at a region along said path, discharging gaseous nitrogen from the chamber in a relationship to produce and maintain an environment of gaseous nitrogen along the process path through which path the articles to be frozen must travel, and while such articles are along said path contacting each article with a continuously moving stream of commingled gases comprised partly of gas freshly generated within the chamber by article contact of liquid nitrogen and partly of gas reclaimed after previous article contacting travel, said stream of commingled gases having a mass flow rate substantially greater than the mass rate of vaporization of liquid nitrogen in the chamber.

14. Apparatus for flash freezing of articles comprising hollow housing structure defining a substantially thermally isolated process chamber, means including a conveyor operating in said chamber for transporting articles in succession along a process path leading into, through and out of said chamber, means including spray nozzle mechanism mounted within said chamber for directing a spray discharge of liquid nitrogen against each article at a certain region along said process path to flash at least partially to gas for freshly generating gaseous nitrogen within said chamber, pumping means operable concurrently with the spray discharge means and having a suction inlet and a discharge outlet communicating with spaced locations within said chamber to develop a high velocity stream traveling along a recirculation flow path through said chamber from said discharge outlet to said suction inlet, said stream being comprised partly of recirculated gaseous nitrogen and partly of freshly generated gaseous nitrogen and said stream impinging upon each article at another region along said process path, and means for maintaining atmospheric pressure substantially throughout the remainder of said chamber by discharging from said apparatus a portion of the gaseous nitrogen after article impingement travel of said portion with said stream.

15. The method of flash freezing articles in a substantially thermally isolated chamber including the steps of transporting each article along a process path leading into, through and out of the chamber, directing a spray discharge of liquid nitrogen against each article when within the chamber at a region along said path to flash at least partially to gas for generating fresh gaseous nitrogen within said chamber, drawing off gaseous nitrogen from another process path region of said chamber and returning some of the drawn off gaseous nitrogen to a process path location upstream of the last named region of the chamber to maintain a high velocity flow stream that operates concurrently with the spray discharge of liquid nitrogen and that impinges upon each article at the last named region along the process path and that is comprised partly of returned gaseous nitrogen and partly of freshly generated gaseous nitrogen, and discharging some of the gaseous nitrogen after article impingement travel in said stream for maintaining atmospheric pressure substantially throughout the remainder of said chamber.

16. Apparatus for flash freezing of articles comprising insulated housing structure defining a substantially thermally isolated process chamber, means for transporting articles along a process path extending through said chamber, and cooperating means for introducing liquid nitrogen into the chamber, converting the liquid nitrogen into relatively cold gaseous nitrogen within the chamber and discharging relatively higher temperature gaseous nitrogen from the chamber in a relationship to produce and maintain a freezing environment of gaseous nitrogen in the chamber, said cooperating means including means for contacting liquid nitrogen with each article along a certain path region in said chamber to vaporize and freshly generate relatively cold gaseous nitrogen in said chamber, and gas pumping means having a suction inlet and a discharge outlet communicating with spaced locations in said chamber in a relationship to develop relatively high velocity gaseous nitrogen flow that is fed by said freshly generated gaseous nitrogen and that travels a recirculation flow path through said chamber from said discharge outlet to said suction inlet, said stream being comprised partly of recirculated gaseous nitrogen and partly of freshly generated gaseous nitrogen and said stream impinging upon each article along a different path region in said chamber at a mass flow rate greater than the mass rate of vaporization of the liquid nitrogen in the chamber.

References Cited by the Examiner

UNITED STATES PATENTS

| | | | |
|---|---|---|---|
| 1,933,257 | 10/1933 | Goosmann | 62—63 X |
| 2,447,249 | 8/1948 | Hill | 62—63 |
| 2,951,353 | 9/1960 | Morrison | 62—63 X |
| 3,018,016 | 1/1962 | Hnilicka | 220—10 |
| 3,022,636 | 2/1962 | Morrison | 62—64 |
| 3,039,276 | 6/1962 | Morrison | 62—64 |
| 3,104,977 | 9/1963 | Morrison. | |
| 3,115,756 | 12/1963 | Overbye | 62—380 X |
| 3,166,425 | 1/1965 | Morrison | 62—374 X |

EDWARD J. MICHAEL, *Primary Examiner.*